(12) United States Patent
Russell (10) Patent No.: US 8,854,368 B1
(45) Date of Patent: Oct. 7, 2014

(54) POINT SPRITE RENDERING IN A CROSS PLATFORM ENVIRONMENT

(75) Inventor: Kenneth Russell, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 126 days.

(21) Appl. No.: 13/421,467

(22) Filed: Mar. 15, 2012

Related U.S. Application Data (60) Provisional application No. 61/472,095, filed on Apr. 5, 2011.

(51) Int. Cl.
*G06T 15/10* (2011.01)

(52) U.S. Cl.
USPC .......................................... 345/426; 717/136

(58) Field of Classification Search
None
See application file for complete search history.

(56) References Cited

U.S. PATENT DOCUMENTS

| | | | |
|---|---|---|---|
| 7,202,877 B2 | 4/2007 | Olson | |
| 8,171,461 B1 * | 5/2012 | Kilgard et al. | 717/136 |
| 2005/0259107 A1 * | 11/2005 | Olson | 345/582 |

OTHER PUBLICATIONS

Green at al. "ARB_fragment_coord_conventions", Version 10, The Khronos Group Inc, Aug. 2, 2009.*

"Point Sprites slower under ES 2.0 than 1.1?," discussion extending from Jul. 21, 2010 to Aug. 13, 2010, Khronos.org Message Boards: Public Discussions about the Khronos Dynamic Media APIs, Khronos Group, accessed at http://www.khronos.org/message_boards/viewtopic.php?f=9&t=3019, accessed on Sep. 26, 2012.

"gl_PointSize problem," discussion extending from Nov. 9, 2009 to Feb. 16, 2010, Khronos.org Message Boards: Public Discussions about the Khronos Dynamic Media APIs, Khronos Group, accessed at http://www.khronos.org/message_boards/viewtopic.php?f=43&t=2184, accessed on Sep. 26, 2012.

* cited by examiner

*Primary Examiner* — Tize Ma
*Assistant Examiner* — Yu Chen
(74) *Attorney, Agent, or Firm* — Sterne, Kessler, Goldstein & Fox P.L.L.C.

(57) ABSTRACT

Method, system, and computer-readable medium for emulating a point sprite represented by a three dimensional vertex in a cross platform environment. The system includes a three dimensional vertex representing a point sprite and a vertex and fragment shaders written in the first programming language. One or more variables are assigned to a set of points representing the 3D vertex using the vertex shader and convey information from the vertex shader to the fragment shader. The point sprite emulator translates the vertex and fragment shaders from the first programming language into a second programming language. The translation includes a transfer of each variable from the vertex shader to the fragment shader such that the information included in each variable is preserved. The point sprite is rendered from the 3D vertex using the translated vertex fragment shaders and displayed on a display screen.

20 Claims, 7 Drawing Sheets

POINT SPRITE RENDERING IN A CROSS PLATFORM ENVIRONMENT

BACKGROUND

Point sprites allow real-time computer graphics to create an on-screen display of realistic smoke, flames, dust, water, and other artistic visual effects. Point sprites are generated from a set of three-dimensional (3D) points that are submitted to a graphics card. The on-screen size of the pixels included in each 3D point is adjusted individually to provide an illusion that more geometry than a single point is being drawn. The 3D point is drawn as an axis-aligned square with a specific edge length.

The OpenGL application programming interface (API) and Direct3D (D3D) API from Microsoft of Redmond, Wash. include mechanisms for drawing real-time computer graphics that include point sprites on a display screen. However, with the ever increasing demand for display of real-time computer graphics in a web browser, the computer graphics may be provided to the computing device in the OpenGL API when the graphics card in the computing environment that processes real-time graphics uses the D3D API or vice versa. As a result, cross-platform emulation of the real-time graphics commands between the OpenGL API and D3D API is essential for the user to experience the desired computer graphics effects. However, conventional systems are not designed for cross-platform point sprite emulation of point sprites having a size greater than one.

BRIEF SUMMARY

Embodiments include a methods, systems, and computer-readable media for rendering a point sprite represented by a three dimensional (3D) vertex in a cross platform environment. The system includes a three dimensional vertex representing a point sprite and a vertex and fragment shaders written in the first programming language. One or more variables are assigned to a set of points representing the 3D vertex using the vertex shader and convey information from the vertex shader to the fragment shader. The point sprite emulator translates the vertex and fragment shaders from the first programming language into a second programming language. The translation includes a transfer of each variable from the vertex shader to the fragment shader such that the information included in each variable is preserved. The point sprite is rendered from the 3D vertex using the translated vertex fragment shaders and displayed on a display screen.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

While the present invention is described herein with references to illustrative embodiments for particular applications, it should be understood that the invention is not limited thereto. Those skilled in the art, with access to the teachings herein, will recognize additional modifications, applications, and embodiments within the scope thereof and additional fields in which the invention would be of significant utility.

The system includes a vertex shader and a fragment shader written in the OpenGL ES Shading Language (ESSL). The point sprite emulator translates the vertex shader and the fragment shader into the D3D High Level Shader Language (HLSL). The translation includes a transfer of each ESSL variable from the vertex shader to the fragment shader using one or more color units. The translation also includes a correction for the difference between the coordinate system associated with Open GL and D3D application programming interfaces (APIs). The translation also includes a synthesis of a fragment coordinate variable and translation of a point size variable. The translated vertex and fragment shaders are processed by a GPU and generate the point sprite on a display screen.

Figure 1:
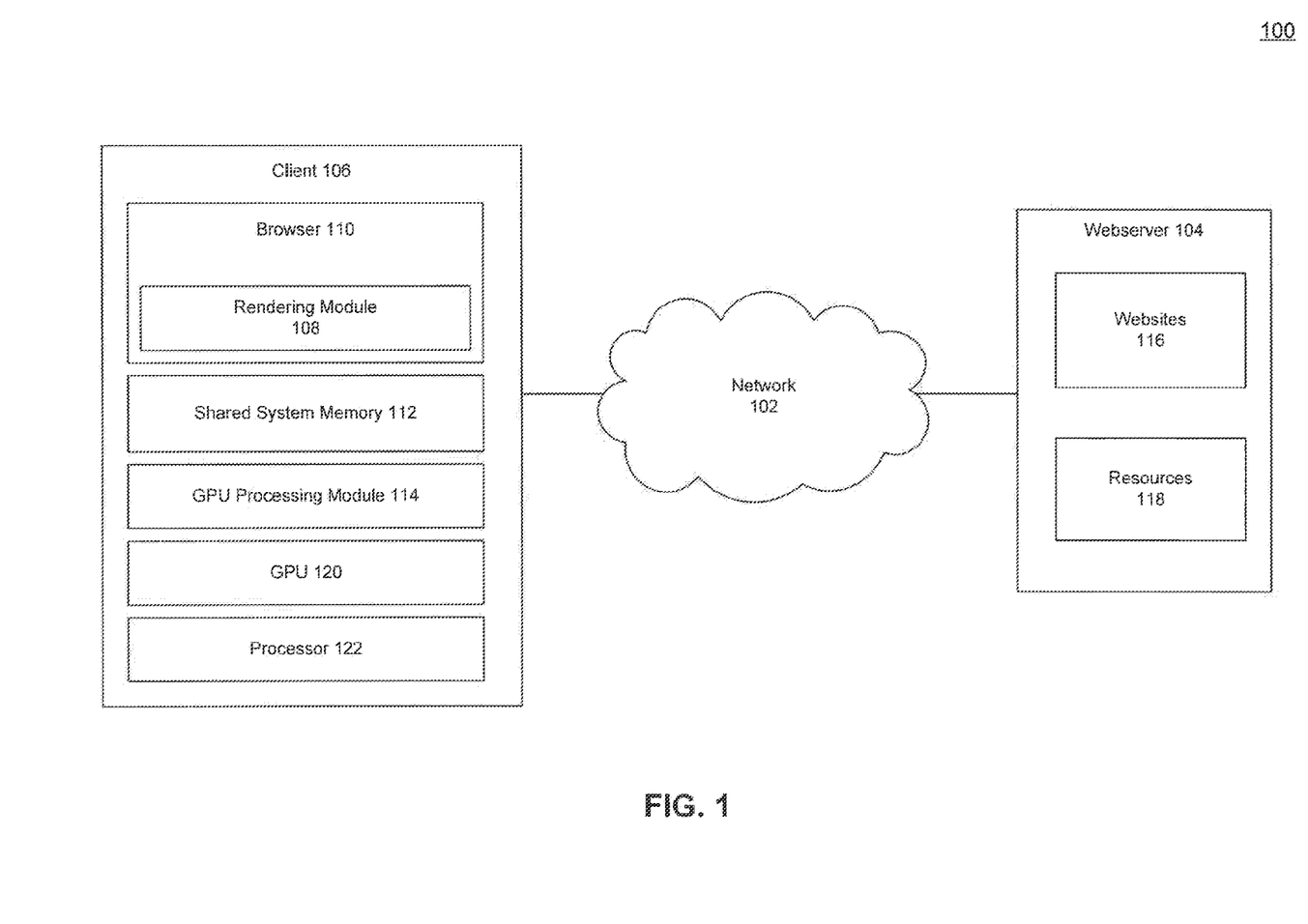
FIG. 1 is a block diagram of an exemplary distributed system environment suitable for providing and displaying real-time computer graphics.

FIG. 1 is a block diagram of an exemplary distributed system environment suitable for providing and displaying real-time computer graphics, according to an embodiment. The system 100 includes a network 102, a web server 104 and a client 106. Network 102 connects client 106 and web server 104. Environment 100 may include many thousands of web servers 104 and clients 106.

Network 102 may be any network, or combination of networks, that can carry data communication. Such a network 102 may include, but is not limited to, a local area network, medium area network, and/or wide area network, such as the Internet. Network 102 can support protocols and technologies including, but not limited to, World Wide Web protocols and/or services. Intermediate web servers, gateways, or other servers may be provided between components of the system shown in FIG. 1 depending upon a particular application or environment.

Web server 104 is an electronic device capable of sending, receiving and storing resources 118. Resources 118 are any data that can be provided over network 102. Resources 118 include data inserted into hypertext markup language (HTML) pages, word processing documents, portable document format (PDF) documents, two and three-dimensional images, video, feed sources, and multimedia content, to name only a few. In an embodiment, web server 104 receives a request, such as an HTTP request from client 106, and, in response, sends resources 118 for display on client 106.

Web server 104 hosts multiple websites 116. Website 116 has one or more webpages associated with a domain name and hosted by one or more web servers 104. An example website is a collection of webpages formatted in a HTML that can contain resources 118 described herein, as well as various programming elements, such as scripts.

Client 106 is an electronic computing device capable of requesting, receiving, and displaying resources 118 over network 102. Example clients 106 are personal computers, mobile communication devices, (e.g. smartphones, tablet computing devices, notebooks), set-top boxes, game-console embedded systems, and other devices that can send and receive resources 118 over network 102. Client 106 includes a browser 110, a shared system memory 112, a GPU processing module 114, a graphics card that includes a GPU 120 and a processor 122.

Browser 110 is an application that client 106 executes to display resources 118 to a user. In an embodiment, browser 110 may be a multithreaded browser.

Browser 110 includes a rendering module 108. Rendering module 108 initiates the rendering process for the real-time visual content received by browser 110. Rendering module 108 retrieves resources 118 from browser 110 and passes those resources 118 to a GPU processing module 114 for rendering. For example, rendering module 108 splits resources 118 into rendering data and rendering instructions. Rendering data includes the images or video that is displayed on the display screen. Rendering instructions manipulate the rendering data as it being displayed.

Rendering instructions may be written in a platform-independent graphics language that a GPU processing module 114 understands, and then be converted in to a graphics language that is compatible with the graphics card. For example, the platform-independent graphics language may be a serialized version of OpenGL for embedded systems, such as OpenGL ES 2.0 API (OpenGL ES API). A person skilled in the art will appreciate that the OpenGL ES API is a graphics language designed for embedded devices such as mobile phones and video-game consoles.

Shared system memory 112 is a memory region on client 106 that is accessible to rendering module 108 and GPU processing module 114. A person skilled in the art will appreciate that browser 110 may execute in a sandboxed environment, because the sandboxed environment limits the access to client's 106 private memory space by malicious software that may be downloaded through network 102. As a result, browser 110 has a limited access to private memory space on client 106. Shared system memory 112 is a memory space designed for a browser 110 to pass rendering data and rendering instructions for real-time graphics processing to GPU 120.

When rendering module 108 stores rendering instructions and rendering data in shared system memory 112, GPU processing module 114 retrieves those instructions and data for rendering on GPU 120.

Figure 2:
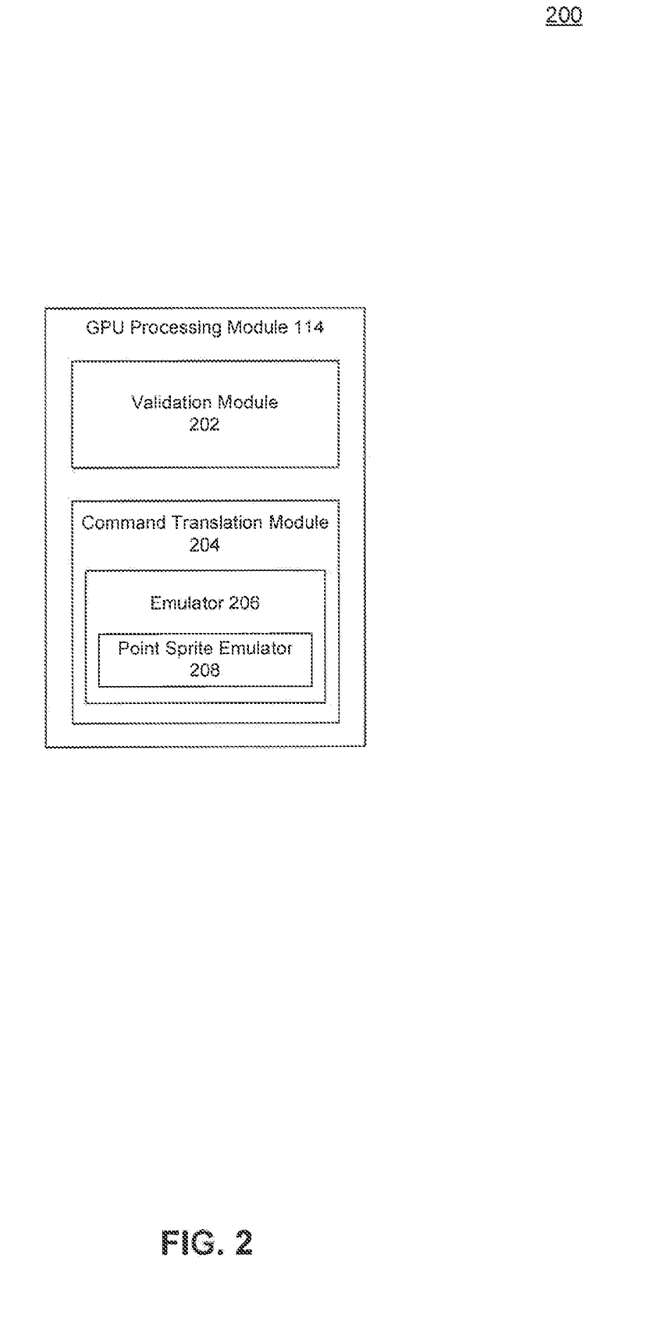
FIG. 2 is a block diagram of an exemplary embodiment of a GPU processing module.

FIG. 2 is a block diagram of a GPU processing module 114, according to an embodiment. GPU processing module 114 includes a validation module 202 and a command translation module 204. GPU processing module 114 uploads and processes rendering instructions and rendering data stored in shared system memory 112.

Validation module 202 prevents invalid rendering instructions and rendering data from reaching GPU 120. For example, when rendering module 108 is compromised and begins to issue incorrect rendering instructions, validation module 202 prevents those rendering instructions from being executed on GPU 120. Similarly, when rendering module 108 issues rendering data that includes undefined data, corrupt data or corrupt rendering instructions, validation module 202 prevents those instructions and data from reaching GPU 120.

Command translation module 204 translates rendering instructions that are in a platform-independent graphics language, into a graphics language that is specific to the computing platform. For example, the Mac OS X or Linux computing platform may use the OpenGL ES API whereas Microsoft's Windows may use the D3D API.

Command translation module 204 includes an OpenGL to D3D Emulator 206 (also referred to as Emulator 206.) Emulator 206 translates rendering instructions received in the platform-independent graphics language, such as OpenGL ES, to D3D for a display on a graphics card that understands D3D rendering instructions. Conventional OpenGL to D3D emulators do not support rendering point sprites of greater than size one.

Figure 3A:
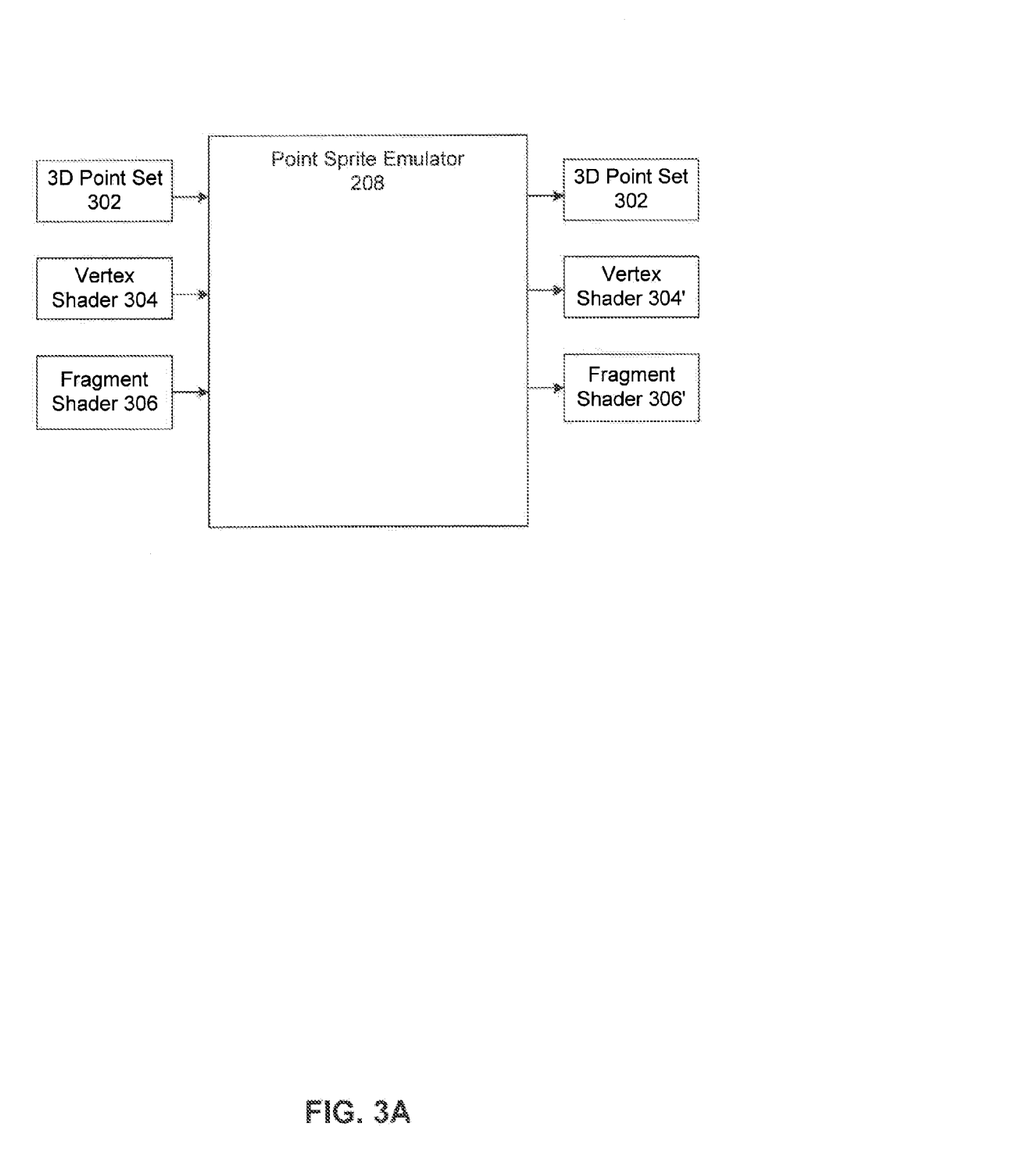
FIG. 3A is a block diagram of an exemplary point sprite emulator.

Emulator 206 includes a point sprite emulator 208. Point sprite emulator 208 supports rendering point sprites of greater than size one, when these sprites are specified using the OpenGL API and rendered using the D3D API. FIG. 3A is a block diagram 300 of an exemplary point sprite emulator 208. A three-dimensional (3D) point set 302 includes a set of vertices. Each vertex in three-dimensional (3D) point set 302 includes an x, y, and z coordinate. These vertices may be drawn as quads or other polygons on a display screen. A person skilled in the art will appreciate that a graphics card draws quads and other polygons as multiple triangles on a display screen. The vertices in three-dimensional point set 302 may also be rendered as point sprites, in which case each vertex is displayed as an individual point sprite on the display screen.

Vertex shader 304 and a fragment shader 306 are computer software programs that may execute on client 106 that are used by a graphics card to manipulate and calculate rendering effects. When vertex shader 304 and fragment shader 306 are written in, for example, the ESSL, point sprite emulator 208 converts the vertex shader 304 and fragment shader 306 into a vertex shader 304' and a fragment shader 306' in D3D's HLSL.

A graphics card uses vertex shader 304 to calculate position, color, and texture of the objects in the 3D graphics environment, and to add special effects. Vertex shader 304 is applied to each vertex in 3D point set 302 by GPU 120 and transforms each vertex from a 3D point into a two-dimensional (2D) point which appears on a display screen.

A graphics card uses fragment shader 306 to compute color and other attributes of each pixel included in a quad or other polygon that is submitted to a display screen by vertex shader 304. Some attributes include applying lighting shadows, highlights, translucency effects, etc.

A developer may transmit information from vertex shader 304 to fragment shader 306 using varying variables. When drawing triangles, GPU 120 applies vertex shader 304 to each of the three vertices that make up a triangle and a varying variable may be assigned to each vertex. GPU 120 then interpolates each varying variable using fragment shader 306 at each pixel covered by the triangle. When drawing point sprites, GPU 120 applies the vertex shader to a single vertex within a 3D point set 302. GPU 120 handles varying variables differently for point sprites depending on whether the OpenGL API or the D3D API are used. In the OpenGL API, the varying variable is supposed to remain constant across the surface of the point sprite.

Conventional systems which translate ESSL into HLSL transmit the varying variables from the vertex shader to the fragment shader using the texture coordinates of the various texture units, such as TEXCOORD[n], where n is the number of the texture unit. However, in the D3D API, the texture coordinates are specified as being interpolated across the surface of the point sprite between the two-dimensional coordinates (0, 0) and (1, 1). As a result, in the HLSL fragment shader, the developer's varying variables are overwritten by the incorrect, interpolated, values.

In the D3D API, the color units COLOR[n], where n is the number of the color units, are interpolated across the surface of triangles, but are constant across the surface of point sprites.

Point sprite emulator 208 allows the display of point sprites with a size greater than one in a cross-platform environment. For example, point sprite emulator 208 translates vertex shader 304 and fragment shader 306 written in ESSL into vertex shader 304' and fragment shader 306' written in HLSL, as described herein, that allows the vertex shader 304' and fragment shader 306' to display point sprites of different sizes.

Point sprite emulator 208 enables rendering of point sprites on a graphics card compatible with the D3D API by enabling the D3DRS_POINTSPRITEENABLE render state.

After point sprite emulator 208 enables the render state, point sprite emulator 208 translates the vertex shader 304 into vertex shader 304' and fragment shader 306 into fragment shader 306' so that the varying variables are not corrupted. For example, when varying variables exist in vertex shader 304', point sprite emulator 208 transmits varying variables from vertex shader 304' to fragment shader 306' using color units, such as COLOR[n], instead of the texture units, as described herein.

After the varying variables are transferred, point sprite emulator 208 synthesizes a gl_PointCoord variable in fragment shader 306', A person skilled in the art will appreciate that gl_PointCoord queries a fragment's position within a point sprite. The point sprite emulator 208 synthesizes gl_PointCoord from the zeroth texture unit's texture coordinate, such as, TEXCOORD[0].

Point sprite emulator 208 also accounts for differences in the coordinate systems of the OpenGL and D3D APIs. In the OpenGL API, a point sprite is rendered as a quad whose upper-left corner has (s, t) texture coordinates of (0, 0) and whose lower-right corner has texture coordinates of (1, 1) as illustrated in FIG. 3B.

Figure 3B:
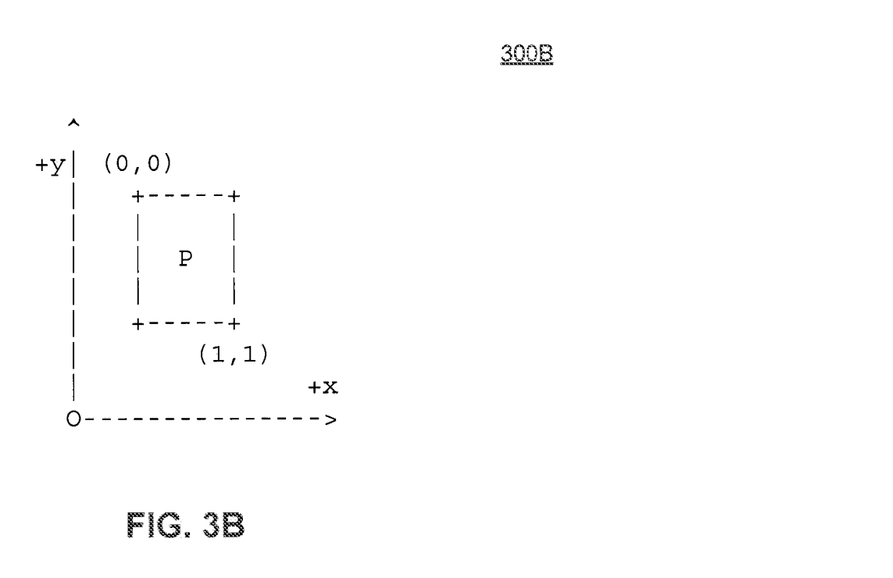
FIG. 3B is an exemplary graph of the coordinate system in the Open GL application programming interface (API).

In FIG. 3B, "P" is the center of the point sprite, and "O" is the origin (0, 0) of the window coordinate system on a display screen. Also, the "y" window coordinate increases from bottom-to-top but the "t" texture coordinate of point sprites increases from top-to-bottom.

Figure 3C:
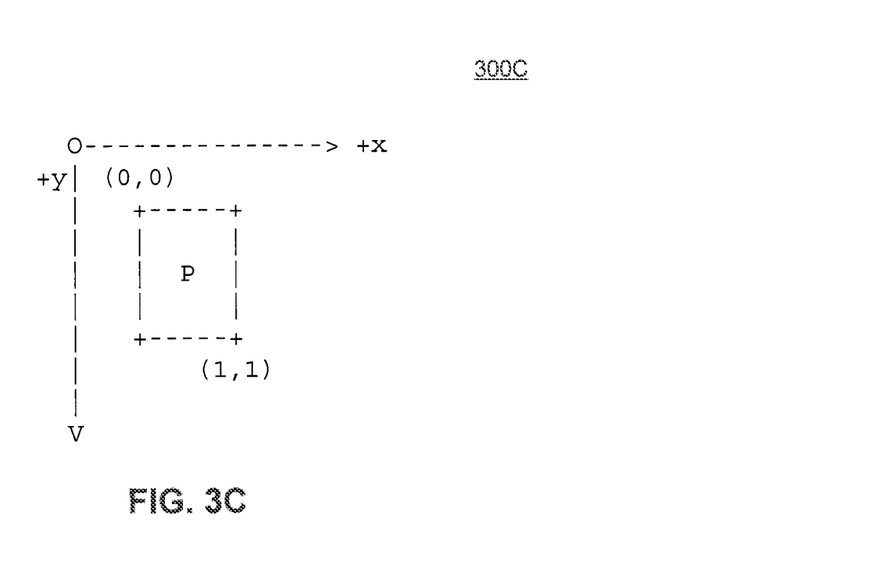
FIG. 3C is an exemplary graph of the coordinate system in the D3D API.

In the D3D, API, a point sprite is also rendered as a quad whose upper-left corner has an (s, t) texture coordinate of (0, 0) and whose lower-right corner has a texture coordinate of (1, 1) as illustrated in FIG. 3C.

In FIG. 3C, "P" is the center of the point sprite, and "O" is the origin (0, 0) of the window coordinate system on a display screen. Also, the "y" window coordinate and the "t" texture coordinate of a point sprite both increase from top-to-bottom.

As described herein, the OpenGL API coordinate system begins in the lower left hand corner, whereas the D3D API coordinate system begins in the upper left hand corner. Point sprite emulator 208 thus flips the vertical texture coordinate in order to account for the differences between the OpenGL and D3D coordinate systems. For example, the gl_PointCoord variable referenced in fragment shader 306 is synthesized from TEXCOORD[0] in fragment shader 306' by the expression float2(TEXCOORD[0].x, 1.0-TEXCOORD[0].y).

After the texture unit coordinates are corrected, point sprite emulator 208 synthesizes the gl_FragCoord variable, containing window relative coordinates x, y, z and 1/w, for fragment shader 306'. In one embodiment, such as HLSL supporting Shader Model 3.0 or greater, gl_FragCoord is synthesized from a variable using D3D's VPOS semantic. In another embodiment, gl_FragCoord is synthesized based on the projected location of the vertex in the viewport.

During the rasterization process, the point sprite described using a vertex in 3D point set 302 is converted into pixels for a display on a display screen or for storage in a bitmap file. In an ESSL vertex shader, the width and height in pixels of the point sprite are controlled by writing to the gl_PointSize variable. Point sprite emulator 208 translates the gl_PointSize variable in vertex shader 304 into a variable in vertex shader 304' using HLSL's PSIZE semantic.

Going back to FIG. 2, GPU 120 is a specialized microprocessor that accelerates real-time computer graphics display on client 106. GPU 120 may be located on a graphics card on client 106. GPU 120 efficiently renders real-time computer graphics due to its highly parallel architecture that is adept at processing complex mathematical algorithms common in graphics calculations.

GPU 120 renders and re-renders a webpage from resources 118. As part of the rendering process, GPU 120 also generates point sprites using 3D point sprite set 302, and for example, vertex shader 304 and fragment shader 306, and displays the point sprites on the display screen.

Processor 122 is any conventional or special purpose processor, including, but not limited to, digital signal processor (DSP), field programmable gate array (FPGA), and application-specific integrated circuit (ASIC). Processor 122 executes applications such as browser 110.

Figure 4:
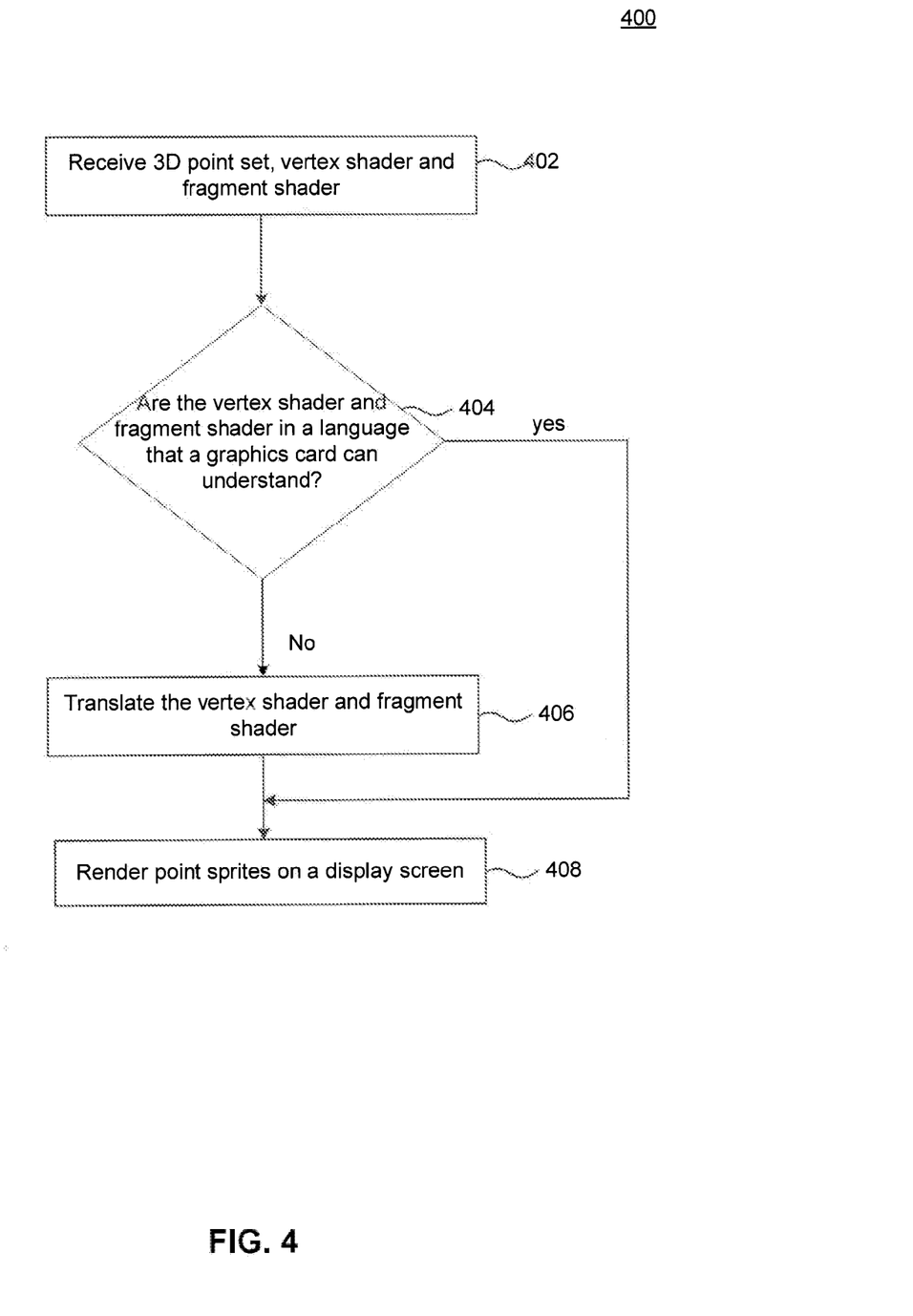
FIG. 4 is a flowchart of a method for rendering point sprites in a cross-platform environment.

FIG. 4 is a flowchart of a method 400 for rendering point sprites in a cross-platform environment, according to an embodiment.

At stage 402, a command translation module 204 receives a point sprite data and corresponding shaders. For example, command translation module 204 receives 3D point set 302, vertex shader 304 and fragment shader 306.

At stage 404, a determination is made as to whether the shaders require translation. For example, command translation module 204 determines whether vertex shader 304 and fragment shader 306 written in ESSL language are compatible with client's 106 platform environment. If vertex shader 304 and fragment shader 306 are compatible, translation is not required and the method proceeds to stage 408. Otherwise, the method proceeds to stage 406.

Figure 5:
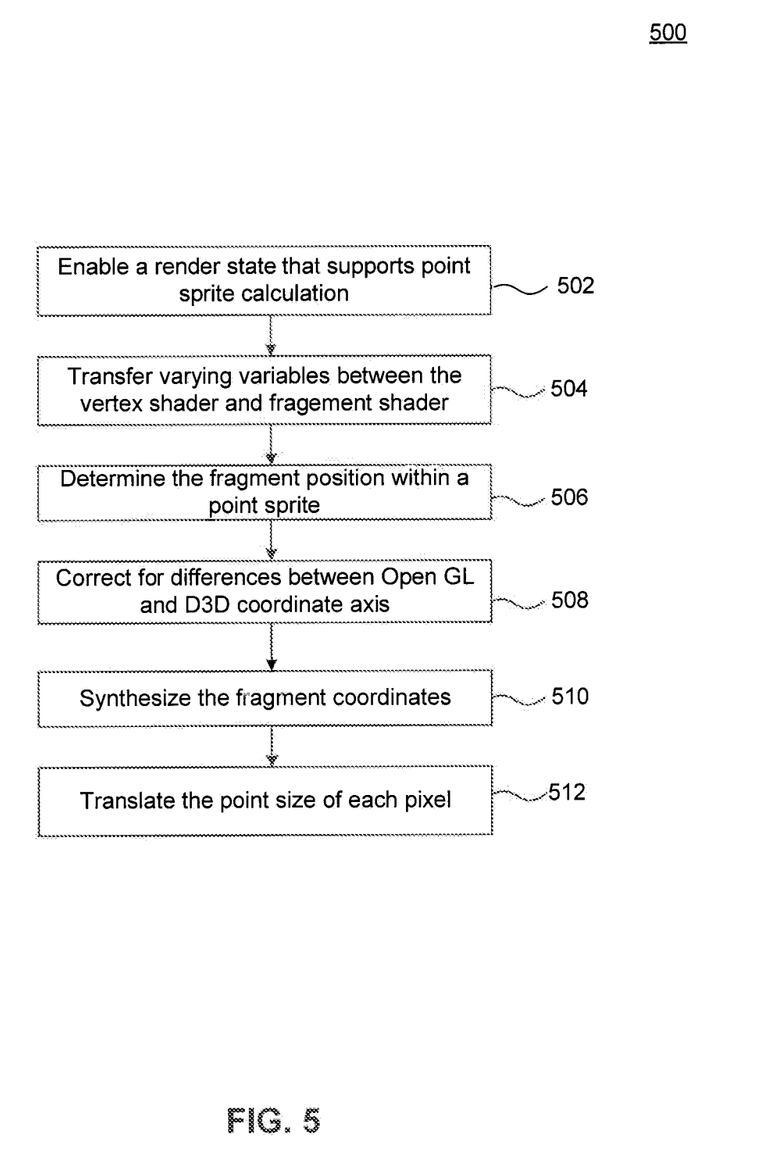
FIG. 5 is a flowchart of a method for converting a vertex shader and a fragment shader.

At stage 406, the shaders are translated. For example, emulator 206 translates vertex shader 304 written in ESSL into vertex shader 304' written in HLSL, and fragment shader 306 written in ESSL into fragment shader 306' written in HLSL. If vertex shader 304 and fragment shader 306 include instructions that generate point sprites, point sprite emulator 208 translates the instructions pertaining to point sprites. FIG. 5, described herein, is a flowchart of a method 500 for translating vertex shader into vertex shader 304' and fragment shader 306 into fragment shader 306' so that point sprites may be rendered after the translation.

At stage 408, GPU 120 processes the rendering instructions included in the shaders. For example, GPU 120 processes rendering data and rendering instructions and displays the result on a display screen.

FIG. 5 is an exemplary embodiment of translating shaders that generate point sprites from ESSL to HLSL, according to an embodiment.

At stage 502, the point sprite render state, D3DRS_POINTSPRITEENABLE, is enabled. The D3DRS_POINTSPRITEENABLE render state allows a graphics card that understands the D3D API to generate point sprites using shaders written in HLSL.

At stage 504, varying variables are transferred between the vertex shader 304' and fragment shader 306', so that their values are preserved. For example, varying variables are transferred using the color units, such as COLOR[n].

At stage 506, a fragment position within a point sprite is determined. For example, gl_PointCoord variable is synthesized from the zeroth texture unit's texture coordinate within the fragment shader 306'.

At step 508, the differences in the coordinate axis are corrected. For example, point sprite emulator 208 flips the vertical texture coordinate of the gl_PointCoord variable in fragment shader 306, so that it is computed from the expression float2(TEXCOORD[0].x, 1.0-TEXCOORD[0].y) in fragment shader 306'.

At step 510, the fragment coordinates are synthesized. For example, point sprite emulator 208 synthesizes the gl_FragCoord variable referenced in fragment shader 306 in fragment shader 306', as described herein.

At step 512, the point size of each pixel is translated. For example, point sprite emulator 208 translates an assignment to the gl_PointSize variable in ESSL in vertex shader 304 to an assignment to a variable with the PSIZE semantic in HLSL in vertex shader 304'.

Figure 6:
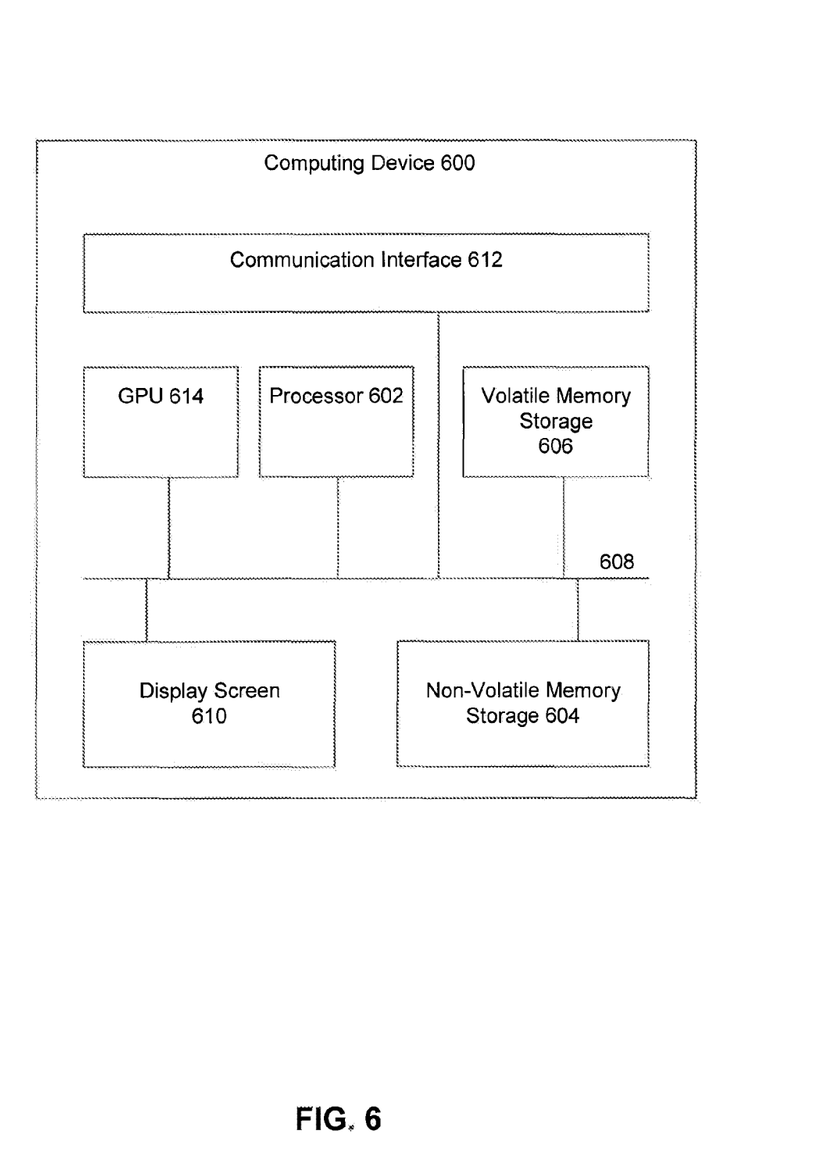
FIG. 6 is a block diagram of an exemplary computing environment.

FIG. 6 is an example computer system 600 in which embodiments of the present invention, or portions thereof, may by implemented as computer-readable code. For example, the components or modules of system 100 may be implemented in one or more computer systems 600 using hardware, software, firmware, tangible computer-readable media having instructions stored thereon, or a combination thereof, and may be implemented in one or more computer systems or other processing systems. Hardware, software, or any combination of such may embody any of the modules and components in FIGS. 1-5.

Web server 106 and client 104 can include one or more computing devices. According to an embodiment, web server 106 and client 104 can include one or more processors 602, one or more non-volatile storage mediums 604, and one or more memory devices 606, a communication infrastructure 608, a display screen 610 and a communication interface 612. Processors 602 can include any conventional or special purpose processor, including, but not limited to, digital signal processor (DSP), field programmable gate array (FPGA), and application-specific integrated circuit (ASIC).

GPU 614 is a specialized processor that executes instructions and programs selected for complex graphics and mathematical operations in parallel.

Non-volatile storage 604 can include one or more of a hard disk drive, flash memory, and like devices that can store computer program instructions and data on computer-readable media. One or more of non-volatile storage device 604 can be a removable storage device. Memory devices 606 can include one or more volatile memory devices such as, but not limited to, random access memory. Communication infrastructure 608 can include one or more device interconnection buses such as Ethernet, Peripheral Component Interconnect (PCI), and the like.

Typically, computer instructions executing on web server 106 or client 104 are executed using one or more processors 602 and can be stored in non-volatile storage medium 604 or memory devices 606.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communication port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communication path. A communication path carries signals and may be implemented using wire or cable, fiber optics, a phone line, a cellular phone link, an RF link or other communications channels.

Embodiments may also be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing, from the general concept of the present invention. Therefore, such adaptations and modifications are intended to be within the meaning and range of equivalents of the disclosed embodiments, based on the teachings and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary section may set forth one or more, but not all exemplary embodiments as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for rendering a point sprite represented by three dimensional (3D) vertices in a cross platform environment, comprising:
assigning one or more variables to a set of points representing the 3D vertices using a vertex shader, wherein the one or more variables convey information from the vertex shader to a fragment shader, and wherein the vertex shader and the fragment shader are written in the first programming language;
translating the vertex shader and the fragment shader into a second programming language wherein the information included in the one or more variables is preserved to render the point sprite using the translated vertex shader and the translated fragment shader, and wherein translating the vertex shader and the fragment shader into the second programming language further comprises:
identifying one or more color units in the vertex shader;
storing the one or more variables in the identified one or more color units;
transferring each variable from the vertex shader to the fragment shader using the identified color units;
correcting for the difference between coordinate systems associated with application programming interfaces (APIs) of the first programming language and the second programming language;
synthesizing a fragment coordinate variable associated with the coordinates of the point sprite in a coordinate system of the second programming language API, wherein the fragment coordinate variable identifies a position of the point sprite as displayed on a display screen; and
translating a point size variable that indicates a size of the point sprite on the display screen; and
generating the point sprite from the 3D vertices using the translated vertex shader and the translated fragment shader.

2. The computer-implemented method of claim 1, further comprising:
rendering the point sprite on a display screen of a computing device.

3. The computer-implemented method of claim 1, wherein the first programming language is OpenGL ES Shading Language (ESSL) and the second programming language is Direct 3D (D3D) High Level Shader Language (HLSL).

4. The computer-implemented method of claim 3, further comprising:
enabling point sprite rendering using the D3D API.

5. The computer-implemented method of claim 1, wherein a size of the point sprite is greater than one pixel.

6. The computer-implemented method of claim 3, wherein correcting the difference between the coordinate systems further comprises:
synthesizing a gl_PointCoord variable using a zeroth texture coordinate unit.

7. The computer-implemented method of claim 6, further comprising:
flipping the vertical texture coordinate using the synthesized gl_PointCoord.

8. A system for rendering a point sprite represented by three dimensional (3D) vertices in a cross platform environment, comprising:
a point sprite emulation module configured to:
assign one or more variables to a set of points representing the 3D vertices using a vertex shader, wherein the one or more variables convey information from the vertex shader to a fragment shader and wherein the vertex shader and the fragment shader are written in the first programming language;
translate the vertex shader and the fragment shader into a second programming language wherein the information included in the one or more variables is preserved to render the point sprite using the translated vertex shader and the translated fragment shader, and wherein to translate the vertex shader and the fragment shader into the second programming language the point sprite emulation module is further configured to:
identify one or more color units in the vertex shader;
store the one or more variables in the identified one or more color units;
transfer each variable from the vertex shader to the fragment shader using the identified color units;
correct for the difference between coordinate systems associated with application programming interfaces (APIs) of the first programming language and the second programming language;
synthesize a fragment coordinate variable associated with the coordinates of the point sprite in a coordinate system of the second programming language API, wherein the fragment coordinate variable identifies a position of the point sprite on a display screen; and
translate a point size variable that indicates a size of the point sprite on the display screen; and
generate the point sprite from the 3D vertices using the translated vertex shader and the translated fragment shader.

9. The system of claim 8, further comprising:
a graphics processing unit (GPU) configured to render the point sprite on a display screen of a computing device.

10. The system of claim 8, wherein the first programming language is OpenGL ES Shading Language (ESSL) and the second programming language is Direct 3D (D3D) High Level Shader Language (HLSL).

11. The system of claim 10, wherein the point sprite emulation module is further configured to enable point sprite rendering using the D3D API.

12. The system of claim 8, wherein the size of the point sprite is greater than one pixel.

13. The system of claim 10, wherein the point sprite emulator is further configured to synthesize a gl_PointCoord variable using a texture coordinate of a zeroth texture unit.

14. The system of claim 13, wherein the point sprite emulator is further configured to flip the vertical texture coordinate using the synthesized gl_PointCoord.

15. A non-transitory computer-readable medium, having instructions stored thereon, that when executed by a processor, cause the processor to perform operations for rendering a point sprite represented by three dimensional (3D) vertices in a cross platform environment, comprising:
assigning one or more variables to a set of points representing the 3D vertices using a vertex shader, wherein the one or more variables convey information from the vertex shader to a fragment shader, and wherein the vertex shader and the fragment shader are written in the first programming language;
translating the vertex shader and the fragment shader into a second programming language wherein the information included in the one or more variables is preserved to render the point sprite using the translated vertex shader and the translated fragment shader, and wherein the translating further comprises:
identifying one or more color units in the vertex shader;

storing the one or more variables in the identified one or more color units;

transferring each variable from the vertex shader to the fragment shader using the identified color units;

correcting for the difference between coordinate systems associated with application programming interfaces (APIs) of the first programming language and the second programming language;

synthesizing a fragment coordinate variable associated with the coordinates of the point sprite in a coordinate system of the second programming language API, wherein the fragment coordinate variable identifies a position of the point sprite as displayed on a display screen; and translating a point size variable that indicates a size of the point sprite on the display screen; and generating the point sprite from the 3D vertices using the translated vertex shader and the translated fragment shader.

16. The non-transitory computer-readable medium of claim 15, wherein the operations that cause the processor to perform operations for rendering, further cause the processor to perform operations comprising:

displaying the point sprite on a display screen of a computing device.

17. The non-transitory computer-readable medium of claim 15, wherein a size of the point sprite is greater than one.

18. The non-transitory computer-readable medium of claim 15, wherein the first programming language is OpenGL ES Shading Language (ESSL) and the second programming language is Direct 3D (D3D) High Level Shader Language (HLSL).

19. The computer-implemented method of claim 1, wherein the one or more variables comprise one or more varying variables.

20. The computer-implemented method of claim 1, wherein the information included in the one or more variables outputted from the translated vertex shader to the translated fragment shader is preserved such that the information included in the one or more variables remains constant.

* * * * *